United States Patent
Joern et al.

(10) Patent No.: US 9,393,881 B2
(45) Date of Patent: Jul. 19, 2016

(54) SEAT TRACK MEMORY WITH SLED LOCK

(71) Applicant: Lear Corporation, Southfield, MI (US)

(72) Inventors: Sandmann Joern, Enningerloh (DE); Sandra Frese, Verl (DE); Hans-Peter Mischer, Bad Meinberg (DE); Michael Wojatzki, Enningerloh (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/431,132

(22) PCT Filed: Oct. 5, 2012

(86) PCT No.: PCT/US2012/058911
§ 371 (c)(1),
(2) Date: Mar. 25, 2015

(87) PCT Pub. No.: WO2014/055083
PCT Pub. Date: Apr. 10, 2014

(65) Prior Publication Data
US 2015/0291061 A1  Oct. 15, 2015

(51) Int. Cl.
*F16M 13/00* (2006.01)
*B60N 2/02* (2006.01)
*B60N 2/06* (2006.01)
*B60N 2/12* (2006.01)
*B60N 2/075* (2006.01)
*B60N 2/08* (2006.01)

(52) U.S. Cl.
CPC ............. *B60N 2/0248* (2013.01); *B60N 2/067* (2013.01); *B60N 2/075* (2013.01); *B60N 2/08* (2013.01); *B60N 2/123* (2013.01)

(58) Field of Classification Search
CPC ........ B60N 2/07; B60N 2/0248; B60N 2/067; B60N 2/123; B60N 2/075; B60N 2/08
See application file for complete search history.

(56) References Cited

U.S. PATENT DOCUMENTS

| 4,844,542 A * | 7/1989 | Humer | B60N 2/123 248/430 |
|---|---|---|---|
| 5,873,629 A | 2/1999 | Schuler | |
| 6,799,800 B2 | 10/2004 | Klahold et al. | |
| 8,408,631 B2 | 4/2013 | Sandmann et al. | |
| 8,939,423 B2 * | 1/2015 | Wojatzki | B60N 2/0818 248/424 |

* cited by examiner

*Primary Examiner* — Amy Sterling
(74) *Attorney, Agent, or Firm* — MacMillan, Sobanski & Todd, LLC

(57) ABSTRACT

A track set includes a memory assembly that is operable to an engaged state to set a user-selected position. When the memory assembly is in an engaged state and in the user-selected position, the memory assembly resists movement of a first rail relative to a second rail in an aft direction. When the memory assembly is in the engaged state and in the user-selected position and the second rail moves in a fore direction relative to the first rail, the memory assembly is displaced in the aft direction relative to the second rail to a first position.

13 Claims, 4 Drawing Sheets

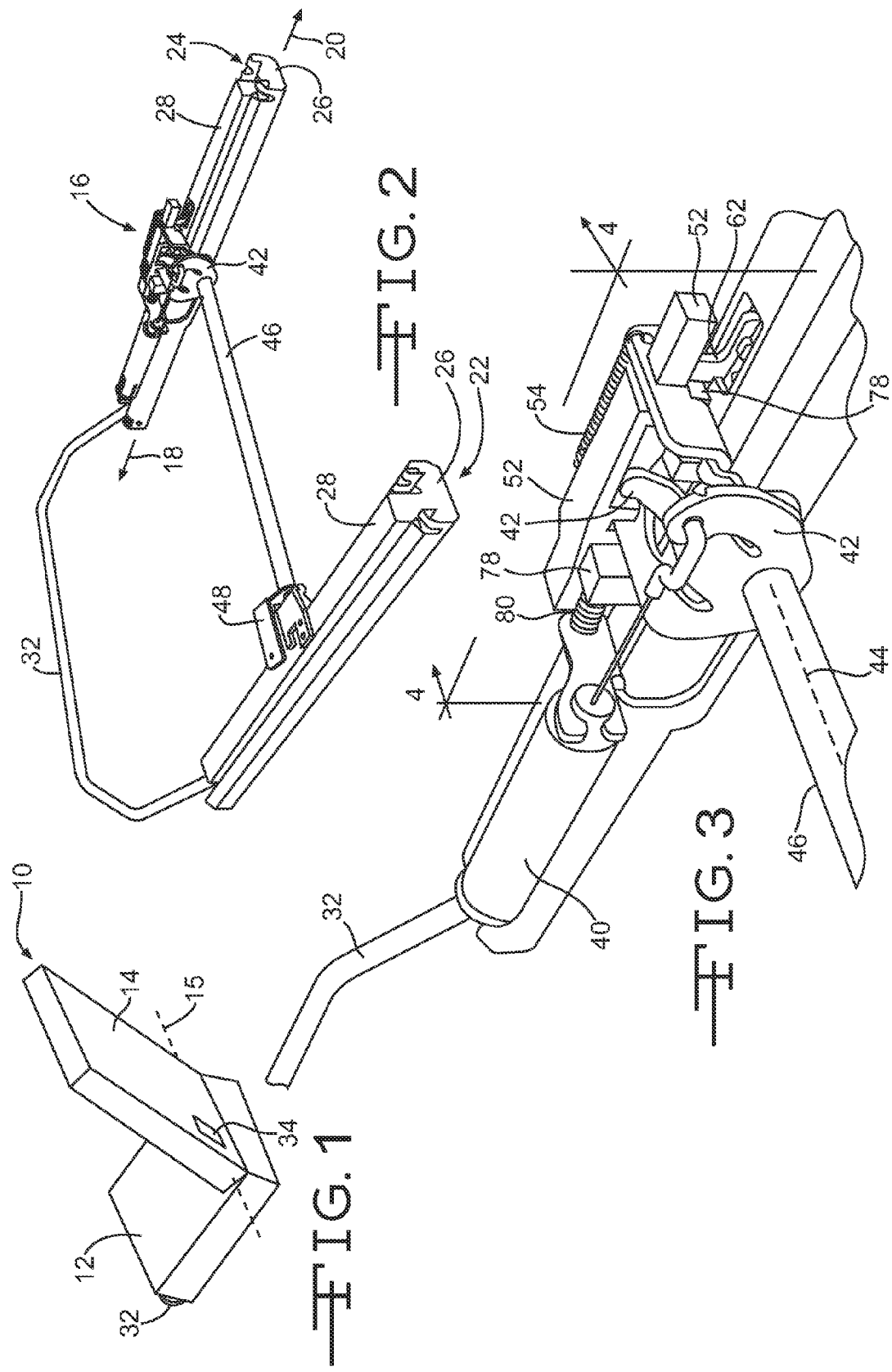

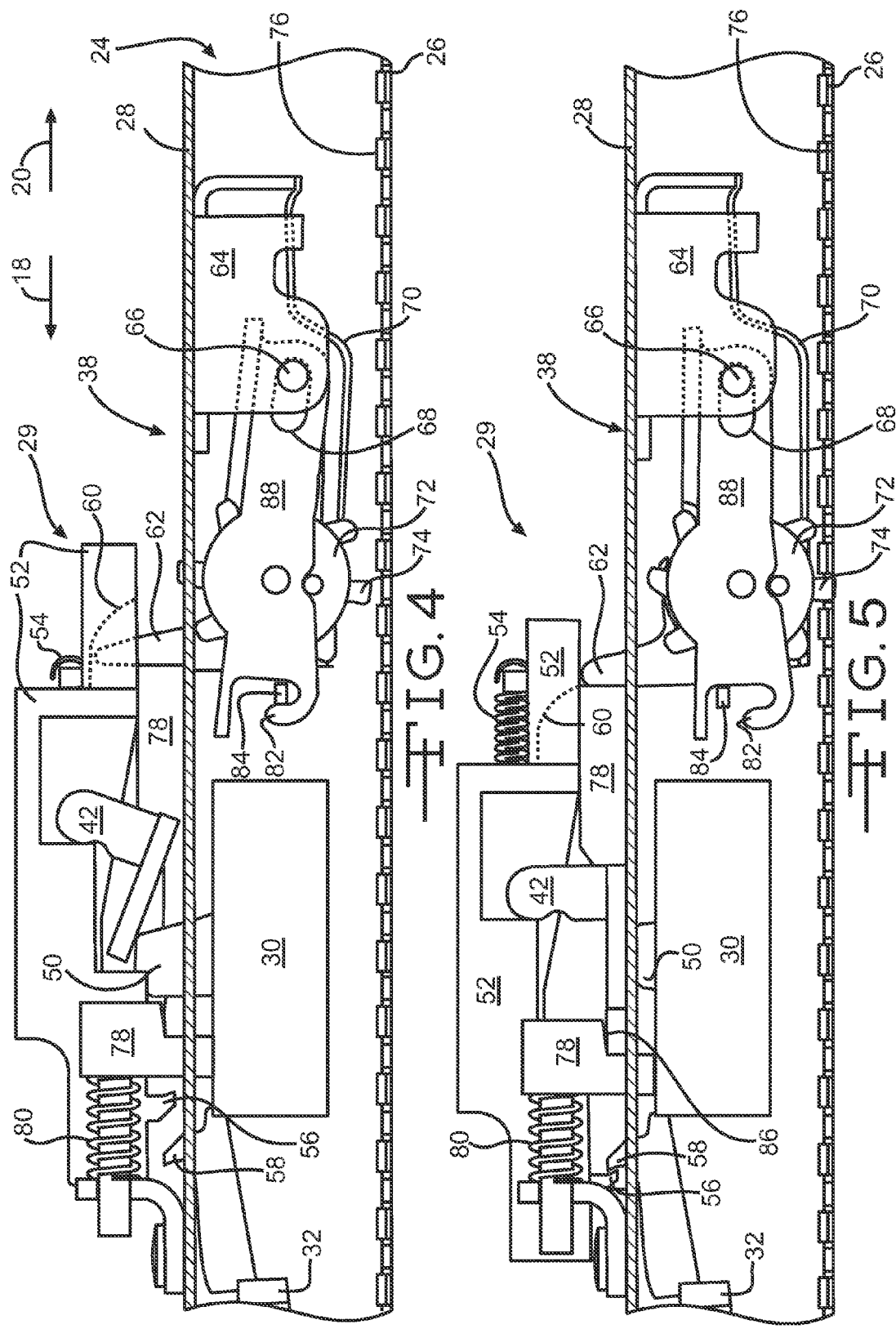

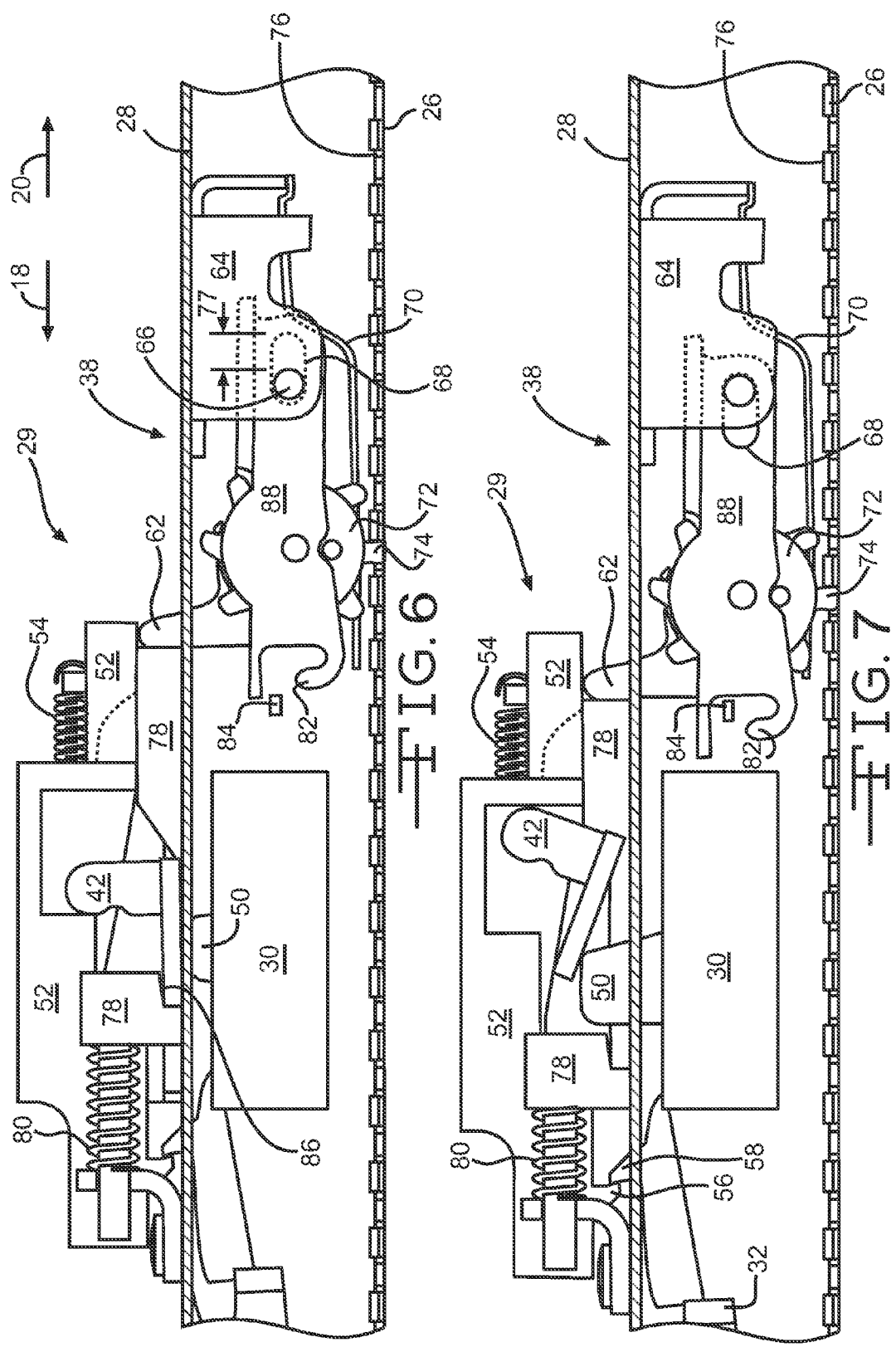

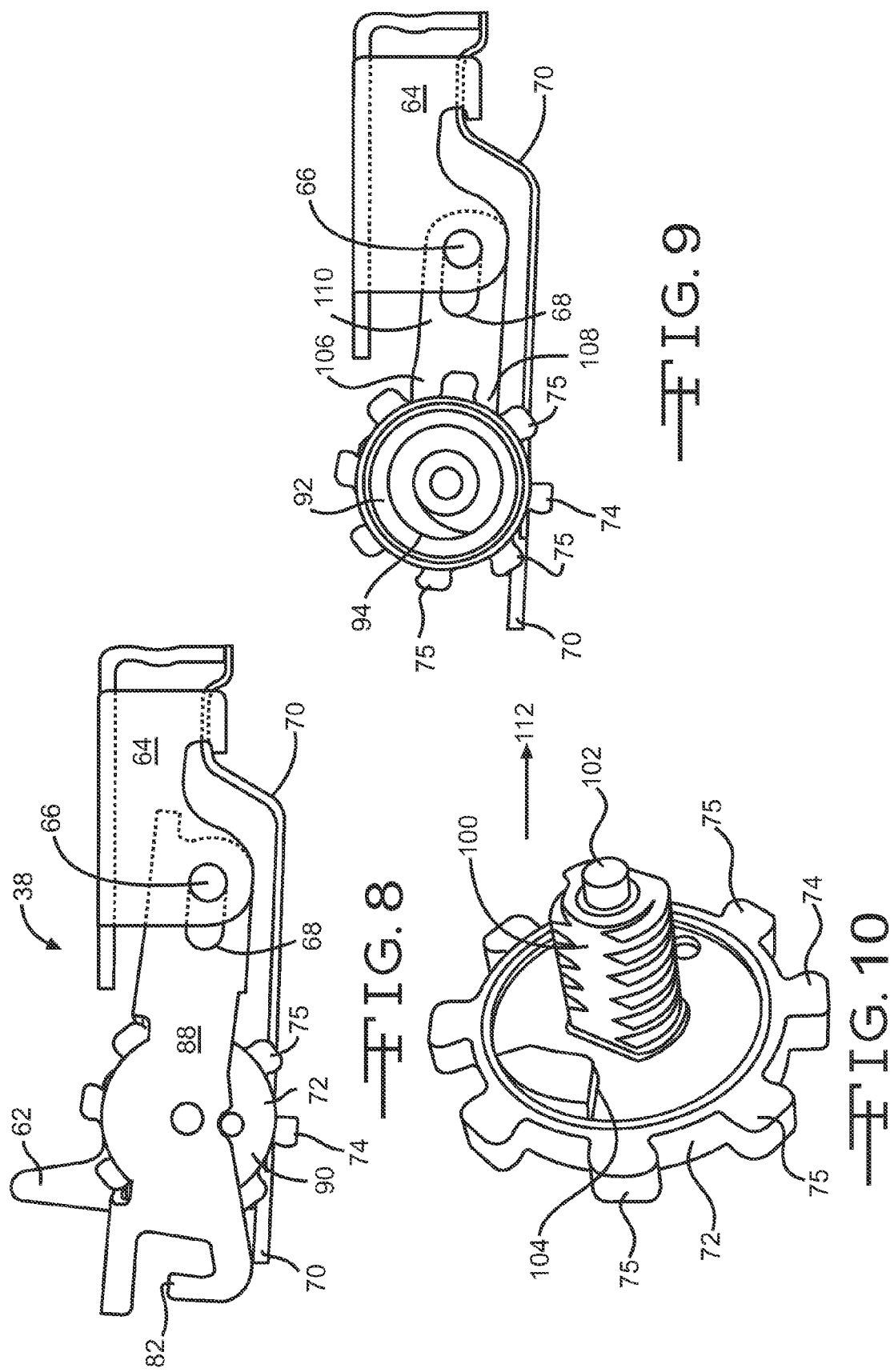

SEAT TRACK MEMORY WITH SLED LOCK

BACKGROUND OF THE INVENTION

This invention relates in general to seats, and more particularly to vehicle seats whose positions may be adjusted fore and aft.

Vehicles, such as passenger cars, include seats for the driver and passengers. These can include bucket-style seats or bench-style seats. The seats for the driver and front-seat passenger are typically adjustable, including the ability to be slid forward and backward within a range of positions. This allows the driver, for example, to select a position for the seat that is the most comfortable when operating the vehicle.

Some vehicles allow a seat to be moved in order to facilitate access to the space behind the seat. This is common in two-door cars, where one door provides access to the front row of seats as well as a rear row of seats. The front seat may be "dumped," wherein the seat is moved to its forward-most position in order to allow easy access to the rear seats. The front seat is then moved back to a use position when access to the rear seats is no longer needed.

Some adjustable seats include a memory system that allows the seat to automatically lock into place when the seat is moved to a position previously selected by an occupant after the seat has been dumped. Thus, the occupant does not have to manually adjust the seat position every time the seat is dumped. It is desirable to have an improved memory system for returning the seat to the user-selected position.

SUMMARY OF THE INVENTION

This invention relates to a track set that includes a first rail and a second rail supported on the first rail for relative movement in a fore direction and an aft direction. A lock assembly is attached to one of the first rail and the second rail and is operable to a locked state to resist relative movement between the first rail and the second rail. A memory assembly is attached to the first rail and operable to an engaged state to set a user-selected position. An activation bracket is operable to an engaged state to operate the lock assembly out of the locked state, and also to operate the memory assembly to the engaged state. When the memory assembly is in the engaged state and in the user-selected position, the memory assembly resists movement of the first rail relative to the second rail in the aft direction. And when the memory assembly is in the engaged state and in the user-selected position and the first rail moves in the fore direction relative to the second rail, the memory assembly is displaced in the aft direction relative to the first rail to a first position.

This invention also relates to a track set that includes a first rail fixed relative to a frame and a second rail supported by the first rail for movement relative to the first rail in a fore direction and an aft direction. A lock assembly is attached to one of the first rail and the second rail, and operable to a locked state to resist relative movement between the first rail and the second rail. A memory assembly is operable to an engaged state to set a user-selected position. The memory assembly includes a memory wheel mounted relative to one of the first rail and the second rail, and a track mounted relative to the other of the second rail and the first rail. The memory wheel includes teeth that engage openings defined by the track when the memory assembly is in the engaged state. When the memory assembly is in the engaged state and in the user-selected position, the memory assembly resists movement of the first rail relative to the second rail in the aft direction. And when the memory assembly is in the engaged state and in the user-selected position and the first rail moves relative to the second rail in the fore direction a predetermined distance, the memory assembly is displaced in the aft direction relative to the first rail the predetermined distance to a first position.

Various aspects of this invention will become apparent to those skilled in the art from the following detailed description of the preferred embodiment, when read in light of the accompanying drawings.

BRIEF DESCRIPTION OF THE DRAWINGS

FIG. 1 is a rear perspective view of a bucket-style seat suitable for use in a passenger vehicle.

FIG. 2 is a rear perspective view of a track assembly used to attach the seat shown in FIG. 1 to the vehicle.

FIG. 3 is an enlarged perspective view of a lock assembly and a memory assembly on the track assembly of FIG. 2.

FIG. 4 is an enlarged cross-sectional view of the lock assembly and the memory assembly taken along the line 4-4 of FIG. 3 and showing the lock assembly and the memory assembly in a non-actuated position.

FIG. 5 is a cross-sectional view similar to that shown in FIG. 4 illustrating the lock assembly and the memory assembly in a first actuated position.

FIG. 6 is a cross-sectional view similar to that shown in FIG. 4 illustrating the lock assembly and the memory assembly in a blocked position.

FIG. 7 is a cross-sectional view similar to that shown in FIG. 4 illustrating the lock assembly and the memory assembly in a second actuated position.

FIG. 8 is a side view of the memory assembly of FIG. 4.

FIG. 9 is a side view similar to that of FIG. 8, with some parts of the memory assembly removed.

FIG. 10 is a perspective view of a memory wheel of the memory assembly of FIG. 4.

DETAILED DESCRIPTION OF THE PREFERRED EMBODIMENT

Referring now to the drawings, there is illustrated in FIG. 1 a bucket-style vehicle seat, indicated generally at 10. The vehicle seat 10 is suitable for use in a passenger car or other vehicle. The vehicle seat 10 includes a seat portion 12 and a back portion 14. The seat portion 12 and the back portion 14 are cushioned to comfortably support an occupant of the vehicle seat 10. The back portion 14 is able to be pivoted relative to the seat portion 12 about an axis 15. The back portion 14 may be pivoted to allow an occupant of the vehicle seat 10 to recline to a comfortable angle. Such vehicle seats are well known in the art. It should be appreciated that the vehicle-mounted seat is used for illustrative purposes only, and the seat may be mounted in non-vehicle environments, if desired.

Referring to FIG. 2, there is illustrated a perspective view of a track assembly indicated generally at 16. The track assembly 16 is attached to the vehicle seat 10 and to a floor of a vehicle (not shown) in order to mount the vehicle seat 10 in the vehicle. The track assembly 16 allows the position of the vehicle seat 10 to be adjusted in a fore direction indicated by arrow 18 as well as an aft direction indicated by arrow 20. It should be appreciated that the terms "fore" and "aft" refer to the directions in the vehicle and are intended for non-limiting, descriptive purposes only. The vehicle seat 10 may be oriented to be adjusted in different directions relative to the vehicle, if desired.

The track assembly 16 includes a first track set, indicated generally at 24, and a second track set, indicated generally at 22. The first track set 24 and the second track set 22 include many similar features, and only the first track set 24 will be described in detail. The first track set 24 includes a first rail or lower rail 26 attached to the floor of the vehicle and a second rail or upper rail 28 that is attached to the seat portion 12 of the vehicle seat 10. The upper rail 28 is supported on the lower rail 26 for relative movement in the fore and aft directions. The design and operation of suitable track sets is well known in the art and will not be described in detail.

Referring to FIG. 4, a cross-sectional view of the first track set 24, taken along the line 4-4 of FIG. 3, is shown. The first track set 24 includes a track lock assembly, indicated schematically at 30, a memory assembly, indicated generally at 38, and an actuator assembly, indicated generally at 29. The track lock assembly 30 serves to selectively prevent movement between the upper rail 28 and the lower rail 26. The memory assembly 38 serves to prevent the vehicle seat 10 from being moved in the aft direction 20 past a user-selected position. The actuator assembly 29 serves to selectively activate the track lock assembly 30 and the memory assembly 38.

The track lock assembly 30 is attached to the upper rail 28 and is operable to a locked state to resist relative movement between the upper rail 28 and the lower rail 26. The design and operation of the track lock assembly 30 is well known in the art and will not be described in detail. In its normal condition, the track lock assembly 30 is urged to its locked state in order to prevent relative movement between the upper rail 28 and the lower rail 26.

The track lock assembly 30 is operatively connected to a towel bar 32 that allows the track lock assembly 30 to be operated out of the locked state and, consequently, allows the position of the vehicle seat 10 to be adjusted in the fore and aft directions. As can be seen in FIG. 1, the towel bar 32 projects from the front of the vehicle seat 10, where the occupant of the vehicle seat 10 can reach it. This allows the occupant to use the towel bar 32 to disengage the track lock assembly 30 and adjust the position of the vehicle seat 10 to a user-selected position.

The vehicle seat 10 may be "dumped" in order to facilitate access to a space behind the vehicle seat 10. This is desirable, for example, in a two-door car when a passenger wishes to get into to the second row of seats. When the vehicle seat 10 is dumped, the back portion 14 is pivoted about the axis 15 to a lowered position closer to the seat portion 12. At the same time, the track lock assembly 30 is operated out of the locked state, allowing the upper rail 28 to be moved relative to the lower rail 26 in the fore direction 18 to a forward position. This increases the amount of space available behind the vehicle seat 10. The vehicle seat 10 may be dumped by operating a release handle 34. The vehicle seat 10 may have more that one release handle 34 positioned so that they may be easily operated by a passenger behind the vehicle seat 10 or outside the vehicle.

When it is no longer desired to have the vehicle seat 10 dumped, the back portion may be pivoted about the axis 15 back to a use position (such as that shown in FIG. 1) and the vehicle seat 10 may be moved in the aft direction 20. The memory assembly 38 resists movement of the upper rail 28 relative to the lower rail 26 in the aft direction 20 beyond the user-selected position. Thus, after it has been dumped, the vehicle seat 10 is freely able to move in either the fore direction 18 or the aft direction 20 until it reaches the user-selected position, at which point the memory assembly 38 prevents further movement in the aft direction 20. Additionally, when the vehicle seat 10 is in the user-selected position and the back portion 14 is in the use position, the track lock assembly 30 will operate to the engaged state such that the vehicle seat 10 will be locked in position. Therefore, the occupant of the vehicle seat 10 will not have to manually reposition the vehicle seat 10 to the user-selected position after the vehicle seat 10 is dumped. The operation of the first track set 24 will now be described in greater detail.

Referring back to FIG. 4, the first track set 24 is illustrated when the vehicle seat 10 is at the user-selected position. The track lock assembly 30 is engaged, preventing relative movement between the lower rail 26 and the upper rail 28. Also, the memory assembly 38 is in a disengaged state. In this position, the vehicle seat 10 cannot move in either the fore direction 18 or the aft direction 20.

FIG. 5 is a cross-sectional view similar to that shown in FIG. 4, illustrating the first track set 24 when the back portion 14 of the seat 10 (shown in FIG. 1) has been moved to the lowered position. As best seen in FIG. 3, the first track set 24 is operatively connected to the back portion 14 by a Bowden cable 40. When the back portion 14 is moved to the lowered position, the Bowden cable 40 pulls on a first activation bracket 42, causing it to pivot about a bracket axis 44 to an engaged state. The first activation bracket 42 is an actuator that is able to pivot between a disengaged state shown in FIGS. 3 and 4, and the engaged state shown in FIG. 5. The first activation bracket 42 is biased to the disengaged state by a torsion spring (not shown) disposed on a connection tube 46. The first activation bracket 42 is attached to a first end of the connection tube 46, and the connection tube 46 is attached at a second end to a second activation bracket 48 on the second track set 22 (shown in FIG. 2). Thus, the connection tube 46 allows the first activation bracket 42 and the second activation bracket 48 to pivot between the engaged state and the disengaged state together.

Referring back to FIG. 5, when the first activation bracket 42 is moved to the engaged state, it engages a button 50 to operate the track lock assembly 30 out of the locked state, and it further engages a first sled 52, moving the first sled 52 in the fore direction 18 against the force of a first sled spring 54. The first sled 52 is able to move between a first position shown in FIG. 4 and a second position shown in FIG. 5. The first sled 52 is biased to the first position by the first sled spring 54. The illustrated first sled spring 54 is a coil tension spring, but other desired items that provide a force suitable to bias the first sled 52 to the first position may be used.

The first sled 52 includes a sled latch 56 that engages a towel bar latch 58 when the first sled 52 is moved to the second position. The towel bar latch 58 is biased to a latch position (upwardly, as shown in FIG. 5) by a towel bar spring (not shown). The sled latch 56 pushes the towel bar latch 58 out of the latch position (downwardly, as viewed in FIG. 5), against the force of the towel bar spring when the first sled 52 is moving to the second position. When the first sled 52 is in the second position, the towel bar latch 58 will move to the latch position. The sled latch 56 and the towel bar latch 58 then engage to prevent movement of the first sled 52 from the second position (shown in FIG. 5) in the aft direction 20 to the first position (shown in FIG. 4) against the force of the first sled spring 54.

The first sled 52 also includes a memory activation surface 60 that engages with a memory switch 62 provided on the memory assembly 38. When the first sled 52 moves to the second position, the memory activation surface 60 applies a force to the memory switch 62. The memory assembly 38 is attached to the upper rail 28 by a pivot bracket 64 that supports a pin 66. The memory assembly 38 defines an elongated slot 68 that the pin 66 passes through. The memory assembly 38 is able to rotate about the pin 66 between a disengaged state (shown in FIG. 4) and an engaged state (shown in FIG.

5). The memory assembly 38 is biased into the disengaged state by a memory spring 70 that is secured to the upper rail 28. The illustrated memory spring 70 is a pre-tensioned flat spring, but other desired items that provide a force suitable to bias the memory assembly 38 to the disengaged state may be used. The force applied to the memory switch 62 by the memory activation surface 60 is sufficient to overcome the biasing force of the memory spring 70 and cause the memory assembly 38 to rotate about the pin 66 to the engaged state. The memory assembly 38 includes a wheel 72 with a blocking tooth 74. When the memory assembly 38 is in the engaged state, the blocking tooth 74 engages a track 76 fixed relative to the lower rail 26.

FIG. 5 illustrates the first track set 24 when the back portion 14 has been moved to the lowered position. The track lock assembly 30 is out of the locked state so the upper rail 28 is able to move relative to the lower rail 26. The first sled 52 is in the second position, and the sled latch 56 is engaged with the towel bar latch 58 so as to maintain the first sled 52 in the second position. The memory assembly 38 is maintained in the engaged state by the first sled 52.

Referring now to FIG. 6, the first track set 24 is shown after the vehicle seat 10 has been moved a first distance in the fore direction 18. The first distance is equal to a length 77 of the elongated slot 68 that is available for longitudinal travel of the pin 66. When the vehicle seat 10 is moved in the fore direction 18, the upper rail 28 moves in the fore direction 18 relative to the lower rail 26. Most of the components of the first track set 24 are mounted on the upper rail 26 and, consequently, also move in the fore direction 18 with the upper rail 28. However, the memory assembly 38 will initially remain in place relative to the lower rail 26.

The first track set 24 includes a second sled 78 that is biased into contact with the memory assembly 38 by a second sled spring 80. The second sled spring 80 also exerts a force in the aft direction 20 on the memory assembly 38. Referring back to FIG. 4, the memory assembly 38 includes a hook 82 that engages with a catch 84 on the upper rail 28 and prevents the memory assembly 38 from being moved in the aft direction 20 by the second sled spring 80. Referring to FIG. 5, the blocking tooth 74 of the memory wheel 72 is engaged with the track 76 and, as will be described below, the memory wheel 72 is unable to rotate in the clockwise direction (as viewed in FIG. 5). Therefore, the memory assembly 38 is not moved in the aft direction 20 by the second sled spring 80. When the memory assembly 38 moves from the position shown in FIG. 4 to the position shown in FIG. 5, the blocking tooth 74 engages the track 76 before the hook 82 disengages the catch 84 in order to provide resistance to the biasing force of the second sled spring 80.

Referring back to FIG. 6, when the upper rail 28 moves in the fore direction 18 relative to the lower rail 26, the memory assembly 38 initially remains in place relative to the lower rail 26 and the track 76. This is because the blocking tooth 74 remains engaged with the track 76, while the pin 66 moves in the elongated slot 68 and the pivot bracket 64 moves in the fore direction 18 relative to the memory assembly 38 for the first distance 77. Once the vehicle seat 10 has been moved the first distance 77 in the fore direction 18, the pin 66 engages the opposite end of the elongated slot 68, and the first track set 24 is in the state shown in FIG. 6. In addition to the pivot bracket 64 having moved the first distance 77 in the fore direction 18 relative to the memory assembly 38, the upper rail 28 and the first activation bracket 42 have also moved the first distance 77 in the fore direction 18 relative to the second sled 78.

The second sled 78 includes a bracket lock 86 that engages a portion of the first activation bracket 42 when the first track set 24 is in the state shown in FIG. 6. When the second sled 78 engages the first activation bracket 42, the first activation bracket 42 is prevented from pivoting about the bracket axis 44 and out of the engaged state. As a result, even if the back portion 14 of the vehicle seat 10 were pivoted to the use position (thereby releasing the force applied on the first activation bracket 42 by the Bowden cable 40), the first activation bracket 42 would remain in the engaged state and the track lock assembly 30 would remain out of the locked state. Thus, the second sled 78 is an actuator lock that is operated to a lock state when the memory assembly 38 is displaced to the first position and the second sled 78 in the lock state resists operation of the first activation bracket 42 out of the engaged state.

The operation of the memory assembly 38 will now be described in reference to FIG. 8. As previously described, the pivot bracket 64 is fixed relative to the upper rail 28, and the memory assembly 38 is rotatable relative to the pivot bracket 64 about the pin 66. The memory spring 70 biases the memory assembly 38 to the disengaged position (shown in FIG. 4). A force is applied to the memory switch 62 by the first sled 52 in order to move the memory assembly 38 to the engaged position (shown in FIG. 5) to set the user-selected position. The memory assembly 38 includes a memory housing 88. The memory switch 62 is connected to the memory housing 88, and the memory housing 88 defines the hook 82. The memory wheel 72 is mounted for rotation relative to the memory housing 88. A wheel cover 90 is located co-axially with the memory wheel 72 on one side of the memory wheel 72. The wheel cover 90 is fixed relative to the memory housing 88, and the memory wheel 72 is able to rotate relative to the wheel cover 90.

Referring to FIG. 9, there is shown a view of the memory assembly 38 similar to that shown in FIG. 8, with the memory housing 88 and the wheel cover 90 removed. The memory wheel 72 defines an interior wheel space 92 that holds a pre-tensioned coil spring 94. A first end of the coil spring 94 is fixed relative to the wheel cover 90, and a second end of the coil spring 94 is fixed relative to the memory wheel 72. Referring to FIG. 10, a reverse side of the memory wheel 72 is shown. The memory wheel 72 includes an axial threaded spindle 100. An outer end 102 of the threaded spindle 100 is attached to the memory housing 88 for rotation relative to the memory housing 88. The memory wheel 72 also includes a memory wheel stop 104.

A memory nut 106 is attached to the threaded spindle 100 at a first end 108 through a threaded opening (not shown) that includes threads that correspond to those on the threaded spindle 100. This allows the memory nut 106 to rotate relative to the threaded spindle 100 and the memory wheel 72. The memory nut 106 also defines a portion of the elongated slot 68 at a second end 110 and engages the pin 66. Because the first end 108 of the memory nut 106 engages the threaded spindle 100 and the second end 110 of the memory nut 106 engages the pin 66, the memory nut 106 is unable to rotate relative to the memory housing 88. As a result, when the memory wheel 72 rotates relative to the memory housing 88, the memory nut 106 moves in an axial direction 112 (into the page as viewed in FIG. 9) along the threaded spindle 100. It should be appreciated that the one full rotation of the memory wheel 72 will cause memory nut 106 to move in the axial direction 112 a distance equal to the spacing between the threads on the threaded spindle 100.

The memory nut 106 includes a nut wheel stop (not shown) that engages with the memory wheel stop 104 when the memory nut 106 is in its closest position to the memory wheel 72. When the nut wheel stop engages the memory wheel stop 104, the memory nut 106 is no longer able to move closer to the memory wheel 72. The memory wheel 72 is then no longer able to rotate in the direction that would cause the memory nut 106 to move closer to the memory wheel 72. The memory assembly 38 is assembled so that the nut wheel stop engages the memory wheel stop 104 when the memory assembly 38 is engaged at the user-selected position (as shown in FIG. 5).

Referring back to FIG. 6, the first track set 24 is shown when the vehicle seat 10 has been moved in the fore direction 18 a first distance 77. If the vehicle seat 10 is moved further in the fore direction 18, the engagement of the blocking tooth 74 with the track 76 will cause the memory wheel 72 to rotate relative to the memory housing 88 (in the counterclockwise direction as viewed in FIG. 6). The memory wheel 72 includes a plurality of teeth 75 that engage the track 76 so that the memory wheel 72 will continue to rotate as the vehicle seat is move in the fore direction 18. The teeth 75 may be made the same as the blocking tooth 74, or the teeth 75 may be smaller or made of lighter material, if desired.

As previously described, the memory nut 106 is at its closest position to the memory wheel 72 when the memory assembly 38 is engaged at the user-selected position, as shown in FIG. 5. This is also the position where the nut wheel stop engages the memory wheel stop 104. It should be appreciated that the memory nut 106 and the memory wheel 72 are in the same positions relative to each other in the state shown in FIG. 6, since the memory wheel 72 has not rotated relative to the memory housing 88. When the vehicle seat 10 is in the position shown in FIG. 6 and is then moved farther in the fore direction 18, the memory wheel 72 rotates and the memory nut 106 moves in the axial direction 112 away from the memory wheel 72. The threads of the threaded spindle 100 have a sufficient pitch so that a complete rotation of the memory wheel 72 allows the nut wheel stop to clear the memory wheel stop 104 and not interrupt rotation of the memory wheel 72.

In this state, the vehicle seat 10 may be freely moved in the fore direction 18 or the aft direction 20. When the seat 10 is moved, the upper rail 28 is moved relative to the lower rail 26. It should be appreciated that when the upper rail 28 is moved in the fore direction 18, the memory wheel 72 will rotate counterclockwise as viewed in FIG. 6 and, as a result, the memory nut 106 will move away from the memory wheel 72. Conversely, when the upper rail 28 is moved in the aft direction 20, the memory wheel 72 will rotate clockwise as viewed in FIG. 6 and, as a result, the memory nut 106 will move closer to the memory wheel 72.

When the vehicle seat 10 is moved to the position that is the first distance 77 from the user-selected position, the first track set 24 is back in the state shown in FIG. 6, the memory nut 106 is at its closest position to the memory wheel 72, and the memory wheel 72 will no longer be able to rotate clockwise. The vehicle seat 10 may still be moved the first distance 77 in the aft direction 20, but the memory wheel 72 will not rotate. Thus, as the upper rail 28 is moved relative to the lower rail 26 in the aft direction 20, the pin 66 will move in the elongated slot 68. This causes the memory assembly 38 and the second sled 78 to move relative to the upper rail 28 longitudinally in the fore direction 18 to the positions shown in FIG. 5. The vehicle seat 10 is now returned to the user-selected position. At this point, the memory assembly 38 will prevent further movement of the upper rail 28 relative to the lower rail 26 in the aft direction 20 and, correspondingly, prevent movement of the vehicle seat 10 in the aft direction 20. A force applied to move the upper rail 28 in the aft direction 18 will be resisted by the engagement of the pin 66 with the elongated slot 68 and the engagement of the blocking tooth 74 with the track 76.

Additionally, the movement of the second sled 78 in the fore direction 18 as described above will move the second sled 78. Because the second sled 78 is engaged with the memory switch 62, the second sled 78 is moved longitudinally in the fore direction 18 against the force of the second sled spring 80. This movement operates the second sled 78 out of the lock state, and the second sled 78 no longer resists operation of the first activation bracket 42 out of the engaged state. That is, the bracket lock 86 no longer engages a portion of the first activation bracket 42. Therefore, if the back portion 14 is raised to the use position (which will remove the force applied by the Bowden cable 40 to the first activation bracket 42), the first activation bracket 42 will pivot about the bracket axis 44 to the disengaged state. This will release the button 50 and allow the track lock assembly 30 to operate to the locked state to resist relative movement between the upper rail 28 and the lower rail 26. The vehicle seat 10 is then locked in the user-selected position.

It is possible that after the seat is dumped, the back portion 14 may be raised to the use position before the vehicle seat 10 has been moved to the user-selected position. As previously described in reference to FIG. 6, the second sled 78 will prevent release of the first activation bracket 42 and, therefore, will prevent operation of the track lock assembly 30. When the vehicle seat 10 is moved back to the user-selected position, the second sled 78 will release the first activation bracket 42, and the track lock assembly 30 will operate as previously described. It should be appreciated that the memory assembly 38 will prevent movement of the vehicle seat 10 beyond the user-selected position in the aft direction 20 independently of the state of the track lock assembly 30. This is advantageous since there can be a delay between the release of the first activation bracket 42 and the operation of the track lock assembly 30. If the track lock assembly 30 were solely relied upon to stop movement of the vehicle seat 10, it is possible that the vehicle seat 10 could be moved past the user-selected position if it is being moved quickly.

Referring now to FIG. 7, the first track set 24 is shown when the vehicle seat 10 is in the user-selected position and the back portion 14 has been raised to the use position. As shown, the first track set 24 is in a similar state to that illustrated in FIG. 6, although the memory assembly 38 is still in the engaged state. Because the sled latch 56 is engaged with the towel bar latch 58, the first sled 52 is maintained in the second position. The first sled 52 remains in the second position until the towel bar 32 is operated to reposition the vehicle seat 10. At that point, the sled latch 56 is no longer engaged by the towel bar latch 58, and the first sled spring 54 will move the first sled 52 to the first position. At this point the first track set 24 will be in the state illustrated in FIG. 4.

As previously described in reference to FIG. 9, the memory wheel 72 includes the coil spring 94. The purpose of the coil spring 94 is to reset the memory assembly 38 in a situation in which the memory assembly 38 is operated to the disengaged position when the vehicle seat 10 is not in the user-selected position. As previously described, the coil spring 94 is attached between the memory wheel 72 and the wheel cover 90. The coil spring 94 is tightened as the memory wheel 72 rotates relative to the wheel cover 90 and the memory housing 88 in the direction that moves the memory nut 106 away from the memory wheel 72. That is, when the vehicle seat 10 is moved in the fore direction 18, energy is stored in the coil spring 94. Correspondingly, when the vehicle seat 10 is moved in the aft direction 20, the energy is released from the coil spring 94. The coil spring 94 is not free to release its energy during normal operation of the memory assembly 38 because the teeth 74 engage the track 76 to prevent rotation of the memory wheel 72 (other than the rotation caused when the upper rail 28 is moved relative to the lower rail 26). However, in the situation in which the memory assembly 38 is moved to the disengaged state while not at the user-selected position, the memory assembly 38 will be in the position shown in FIG. 4, and the memory wheel 72 will be able to rotate relative to the memory housing 88. At this point, the energy stored in the coil spring 94 will cause the memory wheel to rotate relative to the memory housing 88 until the memory nut 106 is in its position closest to the memory wheel 72. The memory nut 106 will engage with the memory wheel 72 and prevent further rotation of the memory wheel 72 as previously described, as well as prevent further release of energy from the coil spring 94. At this point, the memory assembly 38 has been reset and is now able to set the new user-selected position if the vehicle seat 10 is dumped again.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A track set comprising:
   a first rail;
   a second rail supported on the first rail for relative movement in a fore direction and an aft direction;
   a lock assembly attached to one of the first rail and the second rail and operable to a locked state to resist relative movement between the first rail and the second rail;
   a memory assembly attached to the second rail and operable to an engaged state to set a user-selected position; and
   an activation bracket that is operable to an engaged state to operate the lock assembly out of the locked state and to operate the memory assembly to the engaged state;
   wherein when the memory assembly is in the engaged state and in the user-selected position, the memory assembly resists movement of the second rail relative to the first rail in the aft direction; and
   wherein when the memory assembly is in the engaged state and in the user-selected position and the second rail moves in the fore direction relative to the first rail, the memory assembly is displaced in the aft direction relative to the second rail to a first position.

2. The track set of claim 1, wherein the memory assembly resists movement of the second rail relative to the first rail in the aft direction when the memory assembly is in the engaged state and in the user-selected position regardless of the state of the lock assembly.

3. The track set of claim 1, further comprising an actuator lock that is operated to a lock state when the memory assembly is displaced to the first position, wherein the actuator lock in the lock state resists operation of the activation bracket out of the engaged state.

4. The track set of claim 3, wherein the actuator lock is moved linearly when the actuator lock is operated to the lock state.

5. The track set of claim 3, further comprising a sled that is operable to an engaged state to operate the memory assembly to the engaged state.

6. The track set of claim 5, further comprising a latch that resists movement of the sled out of the engaged state regardless of the state of the activation bracket.

7. The track set of claim 6, further comprising a second actuator that is operable to disengage the sled from the latch.

8. A track set comprising:
   a first rail fixed relative to a frame;
   a second rail supported by the first rail for movement relative to the first rail in a fore direction and an aft direction;
   a lock assembly attached to one of the first rail and the second rail, and operable to a locked state to resist relative movement between the first rail and the second rail; and
   a memory assembly operable to an engaged state to set a user-selected position, the memory assembly including a memory wheel mounted relative to one of the first rail and the second rail and a track mounted relative to the other of the second rail and the first rail, the memory wheel including teeth that engage openings defined by the track when the memory assembly is in the engaged state;
   wherein when the memory assembly is in the engaged state and in the user-selected position, the memory assembly resists movement of the second rail relative to the first rail in the aft direction; and
   wherein when the memory assembly is in the engaged state and in the user-selected position and the second rail moves relative to the first rail in the fore direction a predetermined distance, the memory assembly is displaced in the aft direction relative to the second rail the predetermined distance to a first position.

9. The track set of claim 8, further wherein when the memory assembly is in the first position and the second rail moves relative to the first rail in the fore direction, the memory wheel rotates relative to the track.

10. The track set of claim 1, wherein a pin is supported on the pivot bracket and extends through an elongated slot provided on the memory assembly.

11. The track set of claim 8, wherein a pin is supported on the pivot bracket and extends through an elongated slot provided on the memory assembly.

12. A track set comprising:
   first and second rails supported for movement in first and second directions relative to one another; and
   a memory assembly that is operable to an engaged state to set a user-selected position of the first and second rails relative to one another, wherein when the memory assembly is in the engaged state and in the user-selected position, (1) the memory assembly resists movement of the second rail relative to the first rail in the aft direction, and (2) when the second rail moves in the first direction relative to the first rail, the memory assembly is displaced in the second direction relative to the second rail.

13. The track set of claim 1, wherein a pin is supported on one of the first and second rails and extends through an elongated slot provided on the memory assembly.

* * * * *